No. 847,834. PATENTED MAR. 19, 1907.
W. T. SEARS, G. E. GREENLEAF & G. T. REISS.
CONTROLLING MEANS FOR PLANER PLATEN DRIVING MECHANISMS.
APPLICATION FILED SEPT. 18, 1906.

2 SHEETS—SHEET 1.

Witnesses:
Walter P. Pullinger.
Titus H. Drake.

Inventors,
Willard T. Sears.
George E. Greenleaf.
George T. Reiss.
by their Attorneys,
Howson + Howson

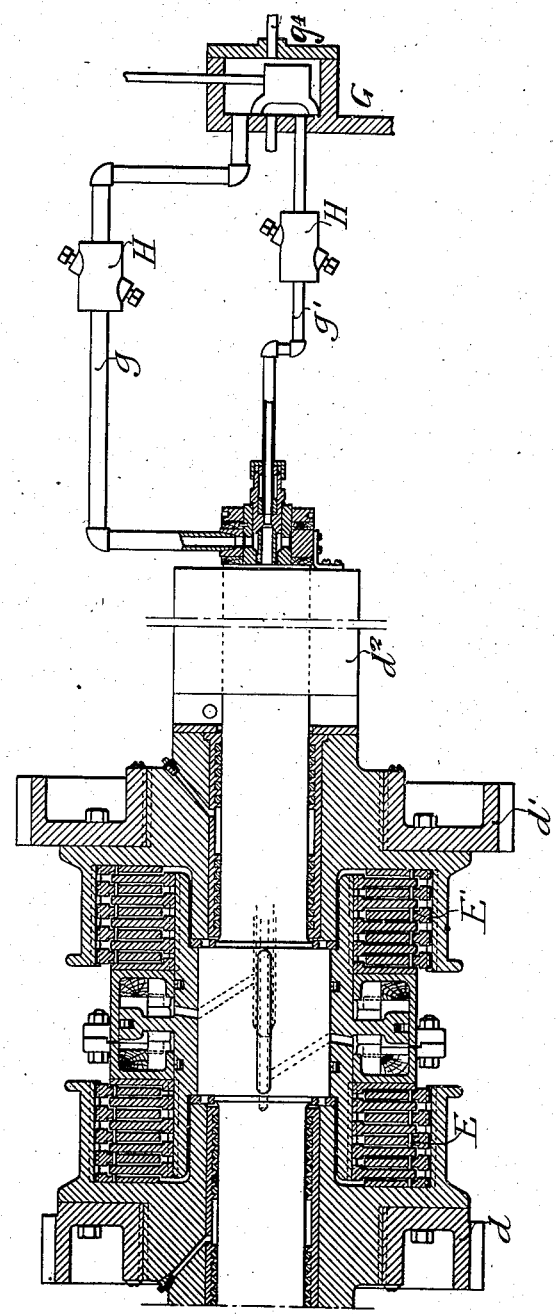

UNITED STATES PATENT OFFICE.

WILLARD T. SEARS, OF PHILADELPHIA, PENNSYLVANIA, GEORGE E. GREENLEAF, OF PLAINFIELD, NEW JERSEY, AND GEORGE T. REISS, OF HAMILTON, OHIO.

CONTROLLING MEANS FOR PLANER-PLATEN-DRIVING MECHANISMS.

No. 847,834.     Specification of Letters Patent.     Patented March 19, 1907.

Application filed September 18, 1906. Serial No. 335,075.

*To all whom it may concern:*

Be it known that we, WILLARD T. SEARS, GEORGE E. GREENLEAF, and GEORGE T. REISS, citizens of the United States, residing, respectively, in Philadelphia, Pennsylvania; Plainfield, New Jersey, and Hamilton, Ohio, have invented certain Improvements in Controlling Means for Planer-Platen-Driving Mechanism, of which the following is a specification.

One object of our invention is to provide improved controlling means for pneumatic clutch mechanism whereby the movement of the planer-platen is reversed at the ends of its path of motion, it being more particularly desired to improve that particular type of controlling mechanism specifically described and claimed in the application for patent made by John H. B. Bryan, filed June 18, 1906, Serial No. 322,184, with a view to avoiding strain and possible breaking of various parts of the machine, on the one hand, and the slipping of the clutches and consequent uncertainty of action of the machine, on the other. These objects we attain as hereinafter set forth, reference being had to the accompanying drawings, in which—

Figure 1:
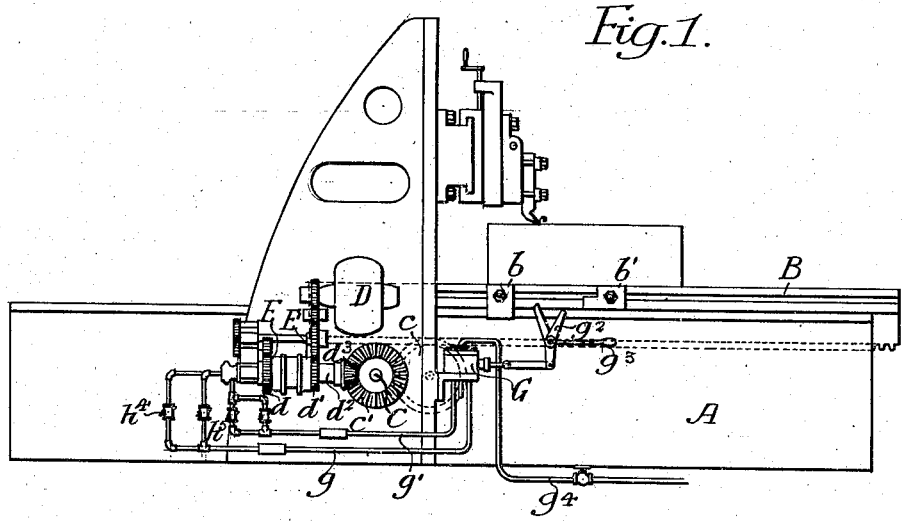
Figure 2:
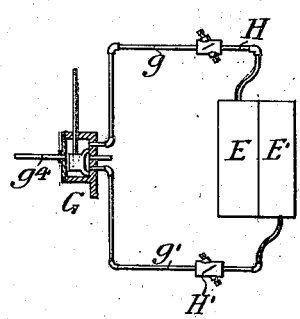
Figure 3:
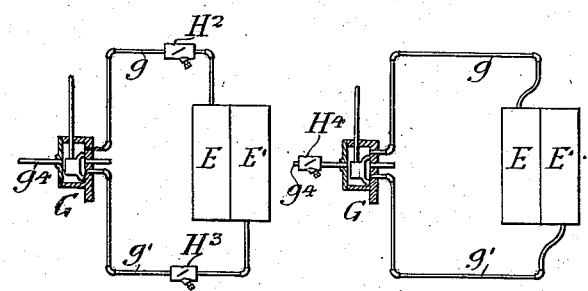
Figure 4:
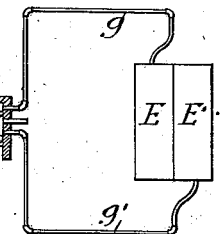
Figure 5:
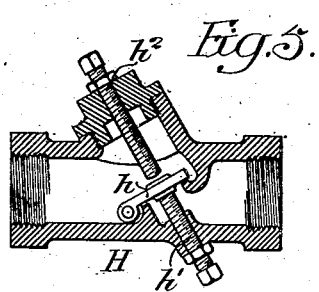

Figure 1 is a side elevation of a planer, illustrating our improved controlling mechanism as applied thereto. Figs. 2, 3, and 4 are diagrammatic views illustrating different arrangements of the apparatus employed in carrying out our invention. Fig. 5 is a vertical section of one form of valve which may be used; and Fig. 6 is an elevation, to some extent diagrammatic, illustrating two pneumatic clutches of the well-known type as connected with our improved controlling mechanism.

Referring to Figs. 1 and 6 of the above drawings, A is a planer to which our invention may be applied, B being the platen thereof, and C the shaft whereby power is transmitted from an electric motor D or other source of power directly to the bull-wheel $c$ (shown in dotted lines) for driving the platen. The armature-shaft of the motor is connected, through gearing of the ordinary type, to gear-wheels $d$ and $d'$, so as to turn these in opposite directions, and a pair of pneumatic clutches E and E', such as those illustrated in application for United States patent, filed by William J. Hagman, Serial No. 278,492, are provided for the purpose of operatively connecting either of said gears $d$ and $d'$ to the shaft $d^2$. Said shaft carries at one end a bevel-pinion $d^3$, meshing with a bevel-gear $c'$ on the shaft C.

It has hitherto been found that if fluid at a relatively high pressure be employed to operate pneumatic clutches these would be actuated when the air was admitted with such suddenness and force that breakage of some parts of the machine was very likely to occur, while, on the other hand, if fluid at relatively low pressure was employed slipping of the clutch members resulted, with consequent objectionable uncertainty of action of the platen.

In the Bryan application, above referred to, it is proposed to provide means for throttling the exhaust from each one of the clutches at the same time that high-pressure air is supplied to the other, and while this combination of apparatus marks a distinct advance in the art we have found that under operating conditions materially improved results can be secured if in addition to throttling the exhaust the flow of high-pressure fluid for actuating the clutches is also throttled.

In some instances it may be advisable to throttle the fluid supplied for actuating the clutches either before or after its passage through a distributing-valve and without throttling the exhaust. For this purpose we may provide a valve of the construction shown in Fig. 5 in each of the pipes $g$ and $g'$, connecting the distributing-valve G with the respective clutches E and E', as shown diagrammatically in Fig. 2. The distributing-valve G may be of the well known slide type, so placed as to have its valve-rod attached to the operating-lever $g^2$, whose arms are extended so as to be engaged, respectively, by the well-known adjustable dogs $b$ and $b'$, carried by the planer-platen. In addition to such arms the lever is usually provided with a third arm $g^3$, whereby it may be thrown by hand.

The throttle-valves H and H', referred to as being connected in the pipes $g$ and $g'$, are somewhat similar to the well-known check-valve, except that the valve proper, $h$, is provided with two adjustable screws $h'$ and $h^2$, of which the first is so placed as to prevent said valve from seating by a predetermined amount, and the second is adjusted so as to permit its opening to a predetermined extent only. Therefore under operating conditions with the apparatus arranged as shown diagrammatically in Fig. 2 one of the planer-dogs, as $b$, will, for example, so move the lever $g^2$ that the distributing-valve C connects the pipe $g'$ to the source of fluid-supply in connection with the pipe $g^4$ and at the same time connects the pipe $g$ to the exhaust.

High-pressure fluid flowing to the clutch E' through the pipe $g'$ cannot instantly rise to its full pressure inside of said clutch, because, though tending to close, the valve $h$ is prevented from so doing by means of its screw $h'$, and consequently the clutch is not actuated with that suddenness and objectionable shock before noted. This gradual, though none the less effective, operation is further assisted by the fact that the fluid exhausted through the pipe $g$ cannot pass out freely, but is throttled in flowing through the valve H' in said pipe, which is held from opening to its fullest extent by the screw $h'$. The action is the same when the distributing-valve G is so operated as to supply fluid to the clutch E and permit of exhaust from the clutch E', though it is to be noted that under the conditions found in practice it may be advisable to adjust the two valves H and H' differently, since, as is well known, it is desirable that the two clutches operate somewhat differently.

We have found that beneficial results can be obtained by merely throttling the fluid flowing to the clutches without in any way interfering with the freedom of the exhaust, and it is obvious that such throttling may be accomplished either as shown in Fig. 3, by means of the adjustable throttle-valves $H^2$ and $H^3$, placed in the pipes $g$ and $g'$, or, as shown in Fig. 4, it may be accomplished by means of a single throttle-valve $H^4$, placed in the fluid-supply pipe $g^4$. With the first of these arrangements the valves $H^2$ and $H^3$ are free to open to their full extent to permit of the exhaust of fluid from the clutches, but partially close to an extent determined by the adjustment of the screw $h'$ when fluid is supplied to operate said clutches, such adjustment being, if desired, different for each clutch.

In the case illustrated in Fig. 4 the single throttle-valve H controls the fluid-supply to both clutches, so that these are supplied gradually and without shock, while the exhaust, as in the other case, is unimpeded.

As indicated in Fig. 1, each of the pipes $g$ and $g'$ may be branched and provided with valves $h^4$ and $h^5$ in the respective branches. In such case, however, the first of these valves would be arranged to throttle the incoming fluid and would completely close to the exhaust, while the second would throttle the exhaust and be completely closed to incoming fluid under pressure. Such an arrangement of parts, while more complicated than one in which but a single valve H is employed in each of the pipes $g$ and $g'$, is the full equivalent thereof.

We claim as our invention—

1. Controlling apparatus for planer-platens consisting of two pneumatic clutches for moving the platen in opposite directions, a supply-pipe connected to a source of fluid under pressure, a pipe leading from each clutch, a distributing-valve for connecting either of the pipes with the supply-pipe or with the exhaust, and means for throttling or retarding the flow of fluid under pressure to the clutches, substantially as described.

2. Controlling apparatus for planer-platens consisting of two pneumatic clutches for moving the platen in opposite directions, a supply-pipe connected to a source of fluid under pressure, a pipe leading from each clutch, a distributing-valve for connecting either of said pipes with the supply-pipe or with the exhaust, and throttling means in each of the pipes connecting the distributing-valve with the respective clutches, substantially as described.

3. Controlling apparatus for planer-platens consisting of two pneumatic clutches for moving the platen in opposite directions, a supply-pipe connected to a source of fluid under pressure, a pipe leading from each clutch, a distributing-valve for connecting either of said pipes with the supply-pipe or with the exhaust, and a valve in each of the pipes connecting the distributing-valve with the respective clutches, said valves being placed to throttle the fluid flowing to said clutches, with means for adjusting each of the throttle-valves, substantially as described.

4. Controlling apparatus for planer-platens consisting of two pneumatic clutches for moving the platen in opposite directions, a supply-pipe connected to a source of fluid under pressure, a pipe leading from each clutch, a distributing-valve for connecting either of said pipes with the supply-pipe or with the exhaust, and a valve in each of said pipes connecting the distributing-valve with the respective clutches, said latter valves being constructed to throttle both the fluid flowing to the clutches as well as that flowing from the clutches, substantially as described.

5. Controlling apparatus for planer-platens consisting of two pneumatic clutches for moving the platen in opposite directions, a supply-pipe connected to a source of fluid under pressure, a pipe leading from each clutch, a distributing-valve for connecting either of said pipes with the supply-pipe or with the exhaust, and a valve in each of said pipes connecting the distributing-valve with the respective clutches, said latter valves being constructed to throttle the fluid flowing to the clutches and to a variable extent that flowing from the clutches, substantially as described.

6. Controlling apparatus for planer-platens consisting of two pneumatic clutches for moving the platen in opposite directions, a supply-pipe connected to a source of fluid under pressure, a pipe leading from each clutch, a distributing-valve for connecting either of said pipes with the supply-pipe or with the exhaust, and a valve in each of the pipes connecting the distributing-valve with the clutches, with adjustable means for each of said valves for holding it from its seat to any desired extent, and other means for adjusting the amount of its possible opening, substantially as described.

7. Controlling apparatus for planer-platens consisting of two pneumatic clutches for moving said platen in opposite directions, a supply-pipe connected to a source of fluid under pressure, a distributing-valve, pipes connecting said valve with the clutches, and means in said pipes for throttling fluid flowing therethrough in either direction, substantially as described.

In testimony whereof we have signed our names to this specification in the presence of the subscribing witnesses.

WILLARD T. SEARS.
   GEORGE E. GREENLEAF.
   GEORGE T. REISS.

Witnesses to the signature of Willard T. Sears:

ARCHIBALD M. O'BRIEN,
 JNO. S. McDERMOTT.

Witnesses to the signature of George E. Greenleaf:

GEO. B. WEAN,
 FRED E. SUBING.

Witnesses to the signature of George T. Reiss:

J. L. BLAIR,
 W. H. BRUNING.